US006385119B2

(12) United States Patent
Kobayashi et al.

(10) Patent No.: US 6,385,119 B2
(45) Date of Patent: May 7, 2002

(54) INTERNAL SUPPLY VOLTAGE GENERATING CICUIT IN A SEMICONDUCTOR MEMORY DEVICE AND METHOD FOR CONTROLLING THE SAME

(75) Inventors: Isamu Kobayashi; Yoshiharu Kato; Kenji Nagai, all of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/772,076

(22) Filed: Jan. 30, 2001

(30) Foreign Application Priority Data

Jan. 31, 2000 (JP) ....................................... 2000-022150
Jan. 31, 2000 (JP) ....................................... 2000-022152

(51) Int. Cl.[7] .................................................. G06F 1/26
(52) U.S. Cl. ........................ 365/227; 365/226; 713/300
(58) Field of Search ................................ 365/226, 227, 365/229; 713/300

(56) References Cited

U.S. PATENT DOCUMENTS 5,272,677 A * 12/1993 Yamamura .................. 365/227

FOREIGN PATENT DOCUMENTS

JP 7-105682 4/1995

* cited by examiner

*Primary Examiner*—Shawn Riley
(74) *Attorney, Agent, or Firm*—Arent Fox Kinter Plotkin & Kahn, PLLC

(57) ABSTRACT

A method for controlling an internal supply voltage generating circuit reduces power consumption in an active mode. The internal supply voltage generating circuit includes a first voltage-drop regulator, which supplies a relatively large driving power to an internal circuit, and a second voltage-drop regulator, which supplies a relatively small driving power to the internal circuit. First, the second voltage-drop regulator is activated and the first voltage-drop regulator is inactivated in one of a stand-by mode and a power-down mode. Then, at least the first voltage-drop regulator is activated in an active mode, and the first voltage-drop regulator is inactivated in an active pause of the active mode. The first voltage-drop regulator is activated when the active pause is cancelled.

30 Claims, 10 Drawing Sheets

INTERNAL SUPPLY VOLTAGE GENERATING CICUIT IN A SEMICONDUCTOR MEMORY DEVICE AND METHOD FOR CONTROLLING THE SAME

BACKGROUND OF THE INVENTION

The present invention relates to a semiconductor device including a semiconductor memory device, and, more particularly, to an internal supply voltage generating circuit of a semiconductor device for dropping an external supply voltage and generating an internal supply voltage provided to an internal circuit, as well as a method for controlling the same.

For decreasing the amount of current consumed, a semiconductor memory device is provided with two internal supply voltage generating circuits to generate internal supply voltages provided to internal circuits. A first internal supply voltage generating circuit (a large power voltage-drop circuit) consumes a relatively large current and supplies a relatively large driving power. A second internal supply voltage generating circuit (a small power voltage-drop circuit) consumes a relatively small current and supplies a relatively small driving power. In an active mode of the semiconductor memory device, the first and second internal supply voltage generating circuits operate and provide internal supply voltages to internal circuits. In a stand-by mode or a power-down mode, the first internal supply voltage generating circuit stops operating, and only the second internal supply voltage generating circuit provides an internal supply voltage to internal circuits. Since only the second internal supply voltage generating circuit operates, the power consumption of the semiconductor memory device is reduced.

In an active mode, the semiconductor memory device may assume a hold state in accordance with a command (active command) from an MPU (microprocessor unit) or a memory controller. For example, if a read command or a write command is not supplied during the period from when a word line is activated by an active command and a sense amplifier begins to operate to when the semiconductor memory device begins to perform a reset (precharge) operation, the semiconductor memory enters a state of an active pause. During the active pause period, power consumption is small because internal circuits include CMOS transistors, which have low power consumption.

However, during the active pause period, a large amount of current flows through the first voltage-drop regulator of the large power voltage-drop circuit, and it is desired to decrease the power consumption therein. For example, Japanese Patent Laid Open No. 7-105682 discloses a semiconductor memory device provided with a first regulator that in an active mode supplies a relatively large driving power to a sense amplifier during operation of the sense amplifier and a second regulator that, after operation of the sense amplifier, supplies a driving power smaller than that of the first regulator. Thus, in write and read operations after operation of the sense amplifier, a minimum required power is supplied, thereby decreasing the power consumption.

More particularly, the semiconductor memory device is provided with three voltage-drop regulators. In a stand-by mode, only one voltage-drop regulator is activated, while in an active mode all three voltage-drop regulators are activated, and the sense amplifier is made to rise rapidly. When the sense amplifier is stable after the lapse of a predetermined time, the semiconductor memory device enters a state of active pause, and the two voltage-drop regulators are inactivated and on stand-by for the next command operation.

However, since two voltage-drop regulators are still activated in an active pause, it is difficult to minimize power consumption of the internal supply voltage generating circuit. The provision of the three voltage-drop regulators also increases the circuit area and results in a more complicated control system.

FIG. 1 is a schematic block diagram of a conventional control circuit 100 for an internal supply voltage generating circuit and a row system circuit. In a memory cell area, a row system circuit 41 is provided for activating a word line and a row decoder, and an internal supply voltage is provided to the row system circuit 41 from a large power voltage-drop regulator 42. The control circuit 100 includes a command detecting circuit 43, a row control circuit 44, a regulator control circuit 50, which acts as an activating signal generating circuit and controls the large power voltage-drop regulator 42, and an active time-out circuit 80.

The command detecting circuit 43 receives an external command, such as chip select signal, row address strobe signal, column address strobe signal, and write enable signal, from external devices (not shown) and detects various commands in accordance with combinations of the signals.

Upon detection of a refresh command, the command detecting circuit 43 provides a row command signal rowz having a high level to the row control circuit 44 and provides a refresh command signal refz having a high level to the active time-out circuit 80.

In response to the row command signal rowz having a high level, the row control circuit 44 produces a row control signal brasz having a high level and subsequently produces a word line activating signal plez having a high level as a memory cell area activating signal, slightly behind the row control signal brasz.

In accordance with the row control signal brasz at high level, the regulator control circuit 50 produces an activating signal enz at high level to activate the large power voltage-drop regulator 42. In response to the word line activating signal plez at high level, the regulator control circuit 50 causes the activating signal enz to fall when the semiconductor device enters an active pause state upon lapse of time t1 after the rise of the activating signal enz.

The row system circuit 41 is activated by the row control signal brasz at high level provided from the row control circuit 44. At this time, a relatively large driving power is provided to the row system circuit 41 from the activated large power voltage-drop regulator 42, so that the row system circuit operates at a high speed. When the row system circuit 41 is stable, the large power voltage-drop regulator 42 is inactivated, and a driving power is provided to the row system circuit 41 from a small power regulator (not shown).

When the refresh command signal refz at high level is supplied from the command detecting circuit 43, the active time-out circuit 80 provides an active time-out signal tout at low level to the row control circuit 44 upon lapse of a predetermined time t2 after the supply of the word line activating signal plez at high level from the row control circuit 44.

In response to the active time-out signal tout at low level, the row control circuit 44 causes the row control signal brasz to fall, thereby inactivating the row system circuit 41. The row control circuit 44 causes the row control signal brasz and the word line activating signal plez to fall, and in response to the activating signal plez, the active time-out circuit 80 causes the active time-out signal tout to rise. Thus, the row control circuit 44 is ready for the next refresh operation.

As shown in FIG. 2, the regulator control circuit 50 includes a detector circuit 51 and a delay circuit 52. The detector circuit 51 is an exclusive OR circuit including three NAND circuits 53, 54, 55 and three inverter circuits 56, 57, 58. When the row control signal brasz and the word line activating signal plez have different levels from each other, the detector circuit 51 provides a detection signal eor at low level to the delay circuit 52. The first NAND circuit 53 receives the word line activating signal plez and the row control signal brasz, which has been inverted by the first inverter circuit 56. The second NAND circuit 54 receives the row control signal brasz and the word line activating signal plez, which has been inverted by the second inverter circuit 57. The third NAND circuit 55 receives output signals from the first and second NAND circuits 53, 54. An output terminal of the third NAND circuit 55 is connected to the delay circuit 52 via the third inverter circuit 58.

The delay circuit 52 is provided with an input circuit, which includes two inverter circuits 69*a*, 69*b* and two capacitors 69*c*, 69*d*, and an output circuit, which includes a NAND circuit 70*a* and two inverter circuits 70*b*, 70*c*. Between the input circuit and the output circuit are connected a plurality of delay circuits 71. Each delay circuit 71 includes a NAND circuit 71*a*, an inverter circuit 71*b*, and a capacitor 71*c*.

The detection signal eor of the detector circuit 51 is supplied to the NAND circuit 71*a* of the first delay circuit 71 via the input circuit and is delayed by the delay time t1, which is determined according to the number of delay circuits 71, and a delay output signal s1 is output from the last delay circuit 71.

The NAND circuit 70*a* receives the delay output signal s1 from the last delay circuit 71 and the detection signal eor of the detector circuit 51 and provides a NAND output signal as the activating signal enz to the large power voltage-drop regulator 42 via the two inverter circuits 70*b* and 70*c*.

As shown in FIG. 3, if the row control signal brasz rises high during a low-level state of the word line activating signal plez, the detection signal eor falls low. In response to the fall of the detection signal eor, the activating signal enz goes high, whereby the large power voltage-drop regulator 42 is activated, and a relatively large driving power is provided to the row system circuit 41 from the voltage-drop regulator 42.

Then, when the word line activating signal plez rises, the detection signal eor falls, and the activating signal enz falls after a delay time t1 from the rise of the activating signal enz, whereby the large power voltage-drop regulator 42 is inactivated. Thus, when the semiconductor memory device enters an active pause state upon lapse of a predetermined time (delay time t1) after the start of the activating operation, the regulator control circuit 50 inactivates the large power voltage-drop regulator 42.

As shown in FIG. 4, the active time-out circuit 80 includes a detector circuit 81 and a delay circuit 82. The detector circuit 81 includes a NAND circuit 81*a*, which receives the word line activating signal plez and the refresh command signal refz, and an inverter circuit 81*b*. When the refresh command signal refz and the word line activating signal plez are at high level, the detector circuit 81 provides a detection signal nol at low level to the delay circuit 82.

The delay circuit 82 is provided with an input circuit, which includes two inverter circuits 83*a*, 83*b* and two capacitors 83*c*, 83*d*, and an output circuit, which includes a NAND circuit 84*a* and two inverter circuits 84*b* and 84*c*. Between the input circuit and the output circuit are connected a plurality of delay circuits 85. Each delay circuit 85 includes a NAND circuit 85*a*, an inverter circuit 85*b* and a capacitor 85*c*. The active time-out circuit 80 includes a larger number of delay circuits 85 than the delay circuits 71 of the regulator control circuit 50.

When the level of the detection signal nol goes high, an output signal s2 of the final delay circuit 85 rises high after the lapse of delay time t2, which is determined according to the number of delay circuits 85. When the level of the detection signal nol goes low, the output signal s2 of the final delay circuit 85 rises high immediately.

The NAND circuit 84*a* receives the detection signal nol and the output signal s2 of the final delay circuit 85 and provides a NAND output signal as the active time-out signal tout to the row control circuit 44 via the inverter circuits 84*b* and 84*c*.

As shown in FIG. 5, when the word line activating signal plez rises with the refresh command signal refz held at high level, the detection signal nol rises. The active time-out signal tout falls after a delay time t2 from the rise of the detection signal nol (rise of the word line activating signal plez). That is, the precharging operation is completed.

Thereafter, when the word line activating signal plez falls with the refresh command signal refz held at high level, the detection signal nol falls, and in response to the fall of the detection signal nol, the active time-out signal tout rises immediately.

A disadvantage of this system is that the circuit area is increased by both the delay circuits 71 of the regulator control circuit 50 and the delay circuits 85 of the active time-out circuit 80.

Further, since the regulator control circuit 50 and the active time-out circuit 80 are separate from each other, different supply voltages are provided to the delay circuits, which is attributable to the impedance of a power line of the sense amplifier consuming the largest amount of power. This may result in the delay times t1 and t2 fluctuating relative to each other or each delay time fluctuating independently.

SUMMARY OF THE INVENTION

It is a first object of the present invention to provide an internal supply voltage generating circuit of a semiconductor device having reduced power consumption in an active mode.

It is a second object of the present invention to provide a supply voltage generating circuit having reduced circuit area and power consumption.

In a first aspect of the present invention, a method for controlling an internal power supply voltage generating circuit, which supplies power to an internal circuit of a semiconductor device, is provided. The internal supply voltage generating circuit includes a first voltage-drop regulator, which supplies a relatively large driving power to the internal circuit, and a second voltage-drop regulator, which supplies a relatively small driving power to the internal circuit. First, the second voltage-drop regulator is activated and the first voltage-drop regulator is inactivated in one of a stand-by mode and a power-down mode. Then, at least the first voltage-drop regulator is activated in an active mode, and the first voltage-drop regulator is inactivated in an active pause of the active mode. The first voltage-drop regulator is activated when the active pause is cancelled.

In a second aspect of the present invention, a method for controlling an internal supply voltage generating circuit that supplies power to a sense amplifier system internal circuit including a sense amplifier in a semiconductor memory device is disclosed. The internal supply voltage generating circuit includes a first voltage-drop regulator, which supplies a relatively large driving power to the sense amplifier system internal circuit, and a second voltage-drop regulator, which supplies a relatively small driving power to the sense amplifier system internal circuit. First, the second voltage-drop regulator is activated and the first voltage-drop regulator is inactivated in one of a stand-by mode and a power-down mode. At least the first voltage-drop regulator is activated in an active mode, and the first voltage-drop regulator is inactivated in an active pause of the active mode. The first voltage-drop regulator is activated when the active pause is cancelled.

In a third aspect of the present invention, an internal supply voltage generating circuit of a semiconductor memory device is provided that supplies a driving power to a sense amplifier system internal circuit including a sense amplifier. The internal supply voltage generating circuit includes first and second voltage-drop regulators. The first voltage-drop regulator is connected to the sense amplifier system internal circuit. The first voltage-drop regulator is selectively activated in accordance with a first timing signal and supplies a relatively large driving power to the sense amplifier system internal circuit. The first voltage-drop regulator is activated when the semiconductor memory device shifts from one of a stand-by mode and a power-down mode to an active mode, is inactivated when the semiconductor memory device enters a state of an active pause in the active mode, and is activated when the active pause is cancelled. The second voltage-drop regulator is connected to the sense amplifier system internal circuit. The second voltage-drop regulator is constantly activated and supplies a relatively small driving power to the sense amplifier system internal circuit.

In a fourth aspect of the present invention, a control circuit for a supply voltage generating circuit, which supplies an internal supply voltage to an internal circuit, is provided. The internal circuit is selectively activated for a predetermined period in accordance with a control signal. The control circuit includes a signal generating circuit that generates a signal for controlling the control signal. The signal generating circuit includes an activating signal generating circuit that generates an activating signal for selectively activating the supply voltage generating circuit.

In a fifth aspect of the present invention, a semiconductor memory device is provided. The memory device includes a memory cell array and a row system circuit that controls the memory cell array. The row system circuit is selectively activated for a predetermined period of time in accordance with a first control signal. A supply voltage generating circuit supplies an internal supply voltage to the row system circuit in response to an activating signal. A signal generating circuit generates a second control signal for controlling the first control signal. The signal generating circuit includes an activating signal generating circuit that generates an activating signal for selectively activating the supply voltage generating circuit.

Other aspects and advantages of the invention will become apparent from the following description, taken in conjunction with the accompanying drawings, illustrating by way of example the principles of the invention.

BRIEF DESCRIPTION OF THE INVENTION

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
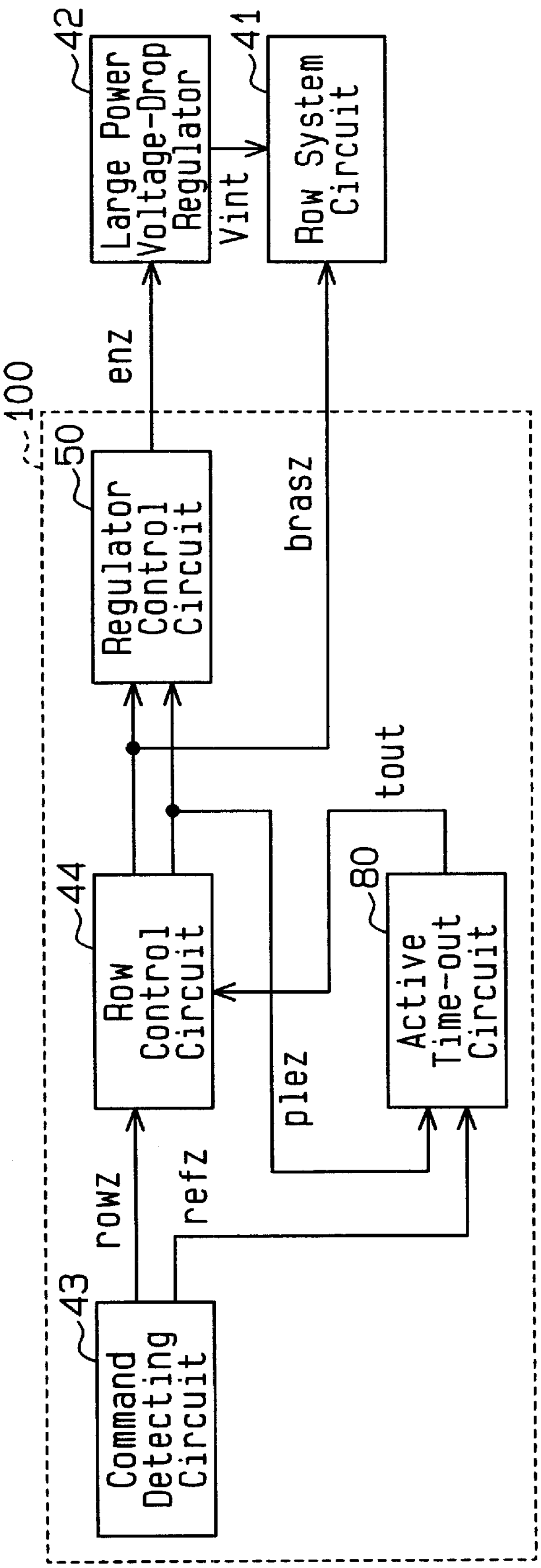
Fig.1 (Prior Art)
FIG. 1 is a schematic block diagram of a conventional prior art control circuit for an internal supply voltage generating circuit and a row system circuit.

In the drawings, like numerals are used for like elements throughout.

An internal supply voltage generating circuit 10 of an overdrive sense type according to a first embodiment of the present invention will be described hereinunder with reference to FIGS. 6, 7, and 8. The internal supply voltage generating circuit 10 is incorporated in a synchronous DRAM (SDRAM) as a semiconductor memory device.

Figure 6:
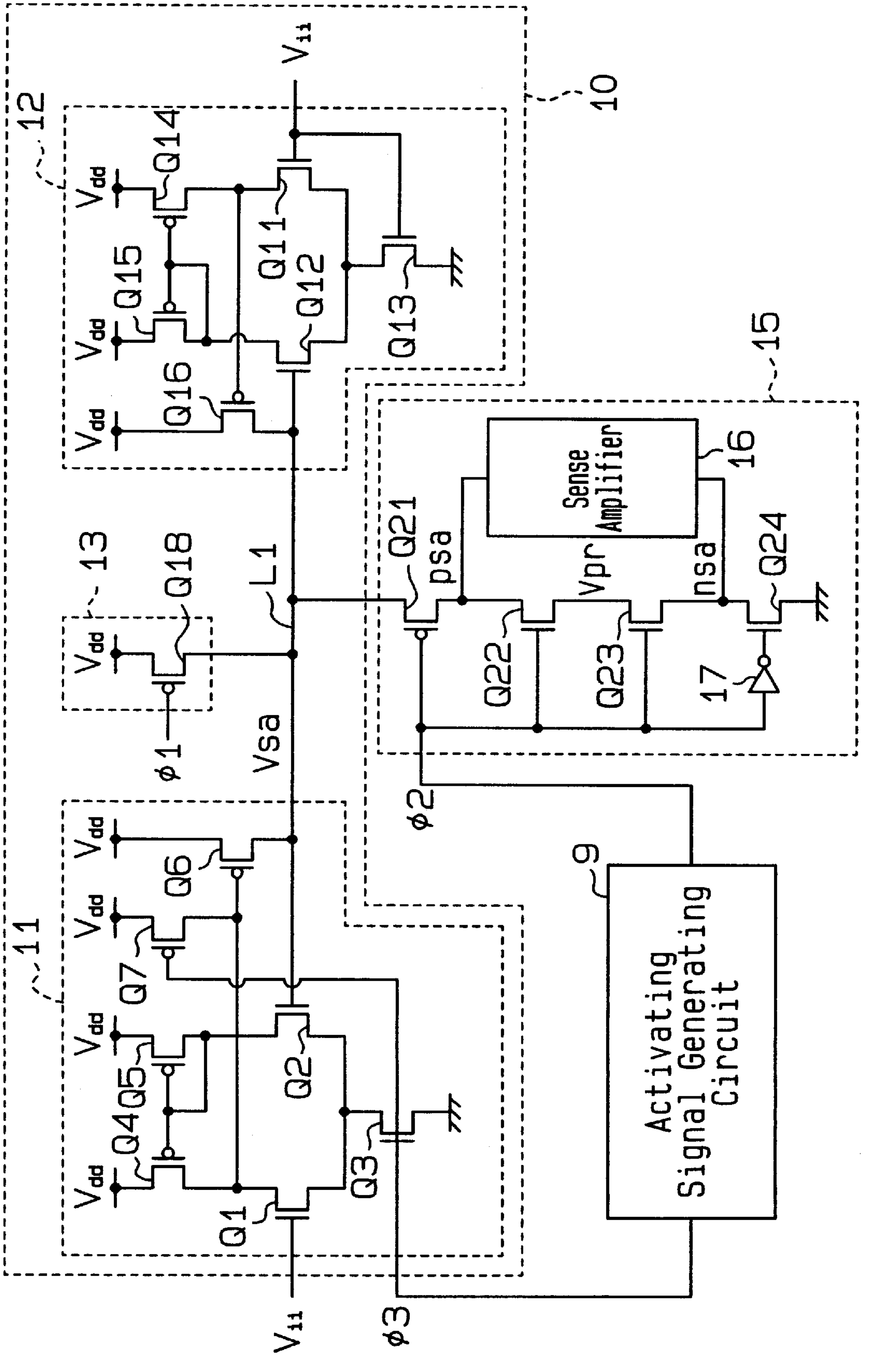
FIG. 6 is a schematic circuit diagram of an internal supply voltage generating circuit according to a first embodiment of the present invention.
Figure 7:
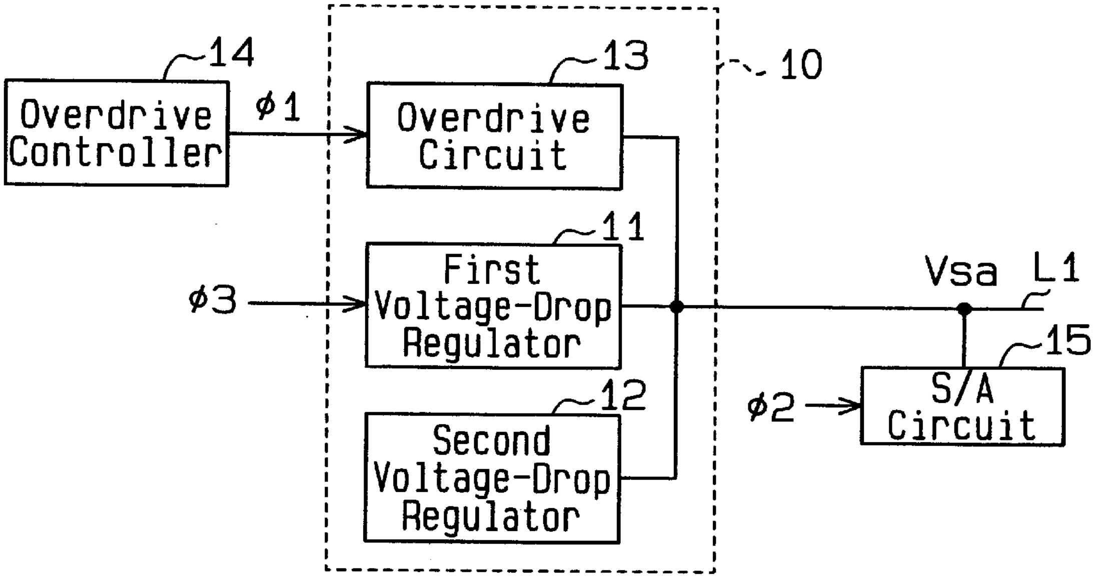
FIG. 7 is a schematic block diagram of the internal supply voltage generating circuit of FIG. 6.
Figure 8:
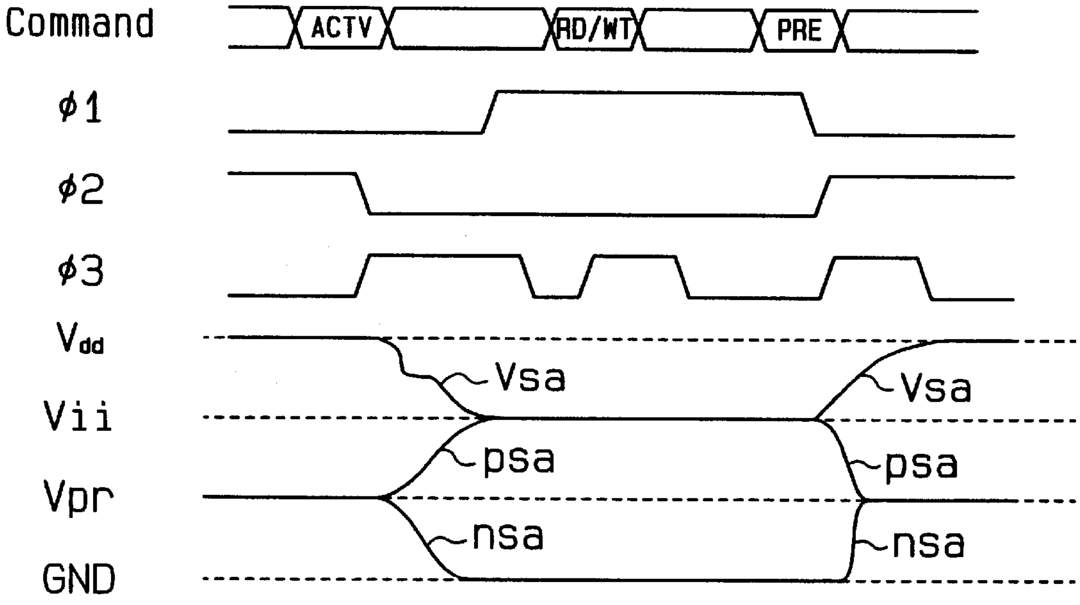
FIG. 8 is a timing waveform diagram illustrating the operation of the internal supply voltage generating circuit of FIG. 6.

As shown in FIGS. 6 and 7, the internal supply voltage generating circuit 10 of a memory array (core) is provided with a first voltage-drop regulator 11, which supplies a relatively large driving power, a second voltage-drop regulator 12, which supplies a relatively small driving power, and an overdrive circuit 13. The first voltage-drop regulator 11 drops an external supply voltage Vdd supplied from an external power supply unit, generates a predetermined internal supply voltage (reference voltage Vii), and provides the internal supply voltage as a sense amplifier supply voltage Vsa to a sense amplifier system internal circuit (S/A type circuit) 15 via an internal power line L1. The second voltage-drop regulator 12 drops the external supply voltage Vdd to generate a predetermined internal supply voltage (reference voltage Vii), and provides the internal supply voltage thus generated as the sense amplifier supply voltage Vsa to the sense amplifier system internal circuit 15 via the internal power line L1. In the first embodiment, the external supply voltage Vdd is set at 3.3 V and the reference voltage Vii is set at 2.6 V.

A drive current of the second voltage-drop regulator 12 is 50 $\mu$A and a current consumption thereof is 2 $\mu$A. The second voltage-drop regulator 12 has the ability to supply a minimum required driving power to the sense amplifier system internal circuit 15 when the SDRAM is in a stand-by mode or in a power-down mode. A drive current of the first voltage-drop regulator 11 is 10 mA and a current consumption of the regulator 11 is 500 $\mu$A. Circuit components such as transistors of the first voltage-drop regulator 11 are larger in size than circuit components of the second voltage-drop regulator 12.

The overdrive circuit 13 provides the external supply voltage Vdd to the internal power line L1 in accordance with a first timing signal ϕ1 provided from an overdrive controller 14. When the first timing signal ϕ1 is at high level, the overdrive circuit 13 is inactivated to cut off the supply of the external supply voltage Vdd to the internal power line L1. On the other hand, when the first timing signal ϕ1 is at low level, the overdrive circuit 13 is activated to supply the external supply voltage Vdd to the internal power line L1.

The sense amplifier system internal circuit 15 includes a sense amplifier 16 (see FIG. 6). The sense amplifier system internal circuit 15 receives the internal supply voltage (reference voltage Vii) from the first and the second voltage-drop regulators 11, 12 or the external supply voltage Vdd from the overdrive circuit 13, as the sense amplifier supply voltage Vsa, via the internal power line L1.

The overdrive controller 14 detects potentials on a pair of bit lines connected to the sense amplifier 16 of the sense amplifier system internal circuit 15. When data signals are provided on the pair of bit lines and the voltage on any one of the bit lines has become the reference voltage Vii, the overdrive controller 14 outputs the first timing signal ϕ1 at high level. When the voltage on any one of the bit lines is not the reference voltage Vii, the first timing signal ϕ1 is output at low level. When the SDRAM is in stand-by mode or power-down mode, the pair of bit lines are shorted and are at a voltage level of a short voltage Vpr below the reference voltage Vii. In this case, the external supply voltage Vdd is provided as the sense amplifier supply voltage Vsa to the internal power line L1.

As shown in FIG. 6, the first voltage-drop regulator 11 is a differential amplifier including a differential amplifier portion which has first and second N-channel MOS (NMOS) transistors Q1, Q2. The sources of the NMOS transistors Q1 and Q2 are connected to ground via a current controlling NMOS transistor Q3. The gate of the current controlling NMOS transistor Q3 is supplied with a third timing signal ϕ3 from an activating signal generating circuit 9, with which signal ϕ3 the first voltage-drop regulator 11 is activated selectively. As shown in FIG. 8, when the SDRAM enters the stand-by mode or the power-down mode, the activating signal generating circuit 9 outputs the third timing signal ϕ3 at low level. When the SDRAM shifts from the stand-by mode or the power-down mode to an active mode in response to an active command ACTV, the activating signal generating circuit 9 outputs the third timing signal ϕ3 at high level, and after the lapse of a predetermined time (when the SDRAM enters an active pause state), the activating signal generating circuit 9 outputs the third timing signal ϕ3 at low level. When a read/write operation or a precharge operation is performed in accordance with an external command (e.g., read command RD, write command WT, or precharge command PRE) during the active pose period, the activating signal generating circuit 9 outputs the third timing signal ϕ3 at high level in response to the external command.

The drains of the NMOS transistors Q1 and Q2 are connected to a power line of the external supply voltage Vdd via P-channel MOS (PMOS) transistors Q4 and Q5. The gates of the PMOS transistors Q4 and Q5 are connected with each other and also to the drain of the second NMOS transistor Q2.

A reference voltage Vii from a reference voltage generating circuit (not shown) is applied to the gate (an inverting input terminal) of the first NMOS transistor Q1. The gate (a non-inverting input terminal) of the second NMOS transistor Q2 is connected to the internal power line L1.

The drain of the first NMOS transistor Q1 is connected to the gate of a driving PMOS transistor Q6. A drain voltage of the first NMOS transistor Q1 is applied to the gate of the PMOS transistor Q6. The drain of the driving PMOS transistor Q6 is connected to the internal power line L1, and the source thereof is connected to the power line of the external supply voltage Vdd.

A PMOS transistor Q7 is connected between the gate of the driving PMOS transistor Q6 and the power line of the external supply voltage Vdd. The third timing signal ϕ3 is provided to the gate of the PMOS transistor Q7.

The first voltage-drop regulator 11 is activated when the third timing signal ϕ3 is at high level and operates such that the sense amplifier supply voltage Vsa on the internal power line L1, which is applied to the gate of the second NMOS transistor Q2, becomes substantially equal to the reference voltage Vii. When the third timing signal ϕ3 is at low level, the first voltage-drop regulator 11 is inactivated, whereby the PMOS transistor Q6 is turned OFF and the supply of the internal supply voltage (reference voltage Vii) to the internal power line L1 is interrupted.

The second voltage-drop regulator 12 is a differential amplifier including a differential amplifier portion which has first and second NMOS transistors Q11, Q12. The sources of the NMOS transistors Q11 and Q12 are connected to ground via a current controlling NMOS transistor Q13. The gate of the transistor Q13 is connected to the gate of the first NMOS transistor Q11.

The drains of the NMOS transistors Q11 and Q12 are connected to the power line of the external supply voltage Vdd via PMOS transistors Q14 and Q15. The gates of the PMOS transistors Q14 and Q15 are connected with each other and also to the drain of the second NMOS transistor Q12.

The reference voltage Vii is applied to the gate (an inverting input terminal) of the first NMOS transistor Q11 from the reference voltage generating circuit, so that the second voltage-drop regulator 12 is activated constantly. The gate (a non-inverting input terminal) of the second NMOS transistor Q12 is connected to the internal power line L1.

The drain of the first NMOS transistor Q11 is connected to the gate of a driving PMOS transistor Q16. The drain voltage of the first NMOS transistor Q11 is applied to the gate of the PMOS transistor Q16. The drain of the driving PMOS transistor Q16 is connected to the internal power line L1, and the source thereof is connected to the power line of the external supply voltage Vdd.

The second voltage-drop regulator 12 operates such that the sense amplifier supply voltage Vsa on the internal power line L1, which is applied to the gate of the second NMOS transistor Q12, becomes substantially equal to the reference voltage Vii.

The overdrive circuit 13 includes a PMOS transistor Q18. The drain of the PMOS transistor Q18 is connected to the internal power line L1 and the source thereof is connected to the power line of the external supply voltage Vdd. The PMOS transistor Q18 is turned on or off in accordance with the first timing signal ϕ1, which is provided to its gate. When the PMOS transistor Q18 is turned on, the external supply voltage Vdd is provided as the sense amplifier supply voltage Vsa to the internal power line L1 via the transistor Q18.

The sense amplifier system internal circuit 15 includes the sense amplifier 16 and an input circuit, which supplies the sense amplifier 16 with the sense amplifier supply voltage Vsa on the internal power line L1. The input circuit includes a PMOS transistor Q21, three NMOS transistors Q22, Q23 and Q24, and an inverter circuit 17. The source of the PMOS transistor Q21 is connected to the internal power line L1 and the drain thereof is connected to ground through the three NMOS transistors Q22–Q24. The second timing signal ϕ2 is provided to the gates of the PMOS transistor Q21 and NMOS transistors Q22, Q23. Further, the second timing signal ϕ2 is applied via the inverter circuit 17 to the gate of the NMOS transistor Q24, which is adjacent to ground.

The sense amplifier 16 is connected between the source of the PMOS transistor Q21 and the NMOS transistor Q24, and the sense amplifier supply voltage Vsa on the internal power line L1 is provided to the sense amplifier 16 in accordance with the second timing signal ϕ2. More specifically, when the second timing signal ϕ2 is at low level, the MOS transistors Q21 and Q24 are turned on, while the MOS transistors Q22 and Q23 are turned off, and the sense amplifier supply voltage Vsa is provided to the sense amplifier 16. Conversely, when the second timing signal ϕ2 is at high level, the MOS transistors Q21 and Q24 are turned off, while the MOS transistors Q22 and Q23 are turned on, and the sense amplifier 16 is power-shorted, whereby the supply of the sense amplifier supply voltage Vsa is interrupted.

The second timing signal ϕ2 is produced by the activating signal generating circuit 9. As shown in FIG. 8, when the SDRAM has entered the active mode in response to the active command ACTV, the activating signal generating circuit 9 outputs the second timing signal ϕ2 at low level, and the sense amplifier supply voltage Vsa is provided to the sense amplifier 16 from the internal power line L1. When the SDRAM has entered stand-by mode or power-down mode, the activating signal generating circuit 9 outputs the second timing signal ϕ2 at high level to cut off the supply of the sense amplifier supply voltage Vsa to the sense amplifier 16. In this case, the sense amplifier 16 is in a power-shorted state (inactive state). When the sense amplifier 16 is inactive, the pair of bit lines are shorted, and a short voltage Vpr is half of the reference voltage Vii.

The following description is about the operation of the internal supply voltage generating circuit 10.

In the stand-by mode or the power-down mode, the third timing signal ϕ3 is set at low level, and the first voltage-drop regulator 11 is in an inactivated state. The second timing signal ϕ2 is set at high level, the sense amplifier 16 is inactivated, and the pair of bit lines are set at the short voltage (<Vii). The first timing signal ϕ1 is set at low level, and the overdrive circuit 13 is activated. In this case, the external supply voltage Vdd, which is higher than the reference voltage Vii, is applied to the internal power line L1. At this time, since the sense amplifier 16 is inactivated, no current flows in the sense amplifier 16 via the overdrive circuit 13. Consequently, in the internal supply voltage generating circuit 10, only a relatively small current flowing through the second voltage-drop regulator 12 is consumed.

When the SDRAM shifts from stand-by mode or power-down mode to active mode, the second timing signal ϕ2 rises and the third timing signal ϕ3 falls. As a result, the sense amplifier 16 is activated and the sense amplifier supply voltage Vsa, which is the external supply voltage Vdd, is provided from the overdrive circuit 13 to the sense amplifier 16 via the internal power line L1. Once the sense amplifier 16 starts operating, the current flowing in the sense amplifier increases, and the sense amplifier supply voltage Vsa (external supply voltage Vdd) decreases. That is, the voltage psa on one of the pair of bit lines rises, while the other voltage nsa drops.

Thereafter, when the voltage psa on one of the pair of bit lines reaches the reference voltage Vii, that is, when the operation of the sense amplifier 16 becomes stable and current consumption decreases, the first timing signal ϕ1 rises. The overdrive circuit 13 is inactivated when the first timing signal ϕ1 is at high level to stop the supply of the external supply voltage Vdd to the internal power line L1. At this time, the internal supply voltage (reference voltage Vii) is provided from the first and second voltage-drop regulator 11, 12 to the internal power line L1, and the sense amplifier supply voltage Vsa on the internal power line L1 is maintained at the reference voltage Vii.

Subsequently, when the SDRAM enters an active pause state and the third timing signal ϕ3 rises, the first voltage-drop regulator 11 is inactivated, and the internal supply voltage (reference voltage Vii) is provided from the second voltage-drop regulator 12 to the internal power line L1. Thus, during the active pause period, the internal supply voltage is provided as the sense amplifier supply voltage Vsa to the sense amplifier 16 from the second voltage-drop regulator 12. As a result, in the internal supply voltage generating circuit 10, only a relatively small current flowing in the second voltage-drop regulator 12 is consumed.

When the SDRAM shifts from the active pause (active mode) to stand-by mode or power-down mode, the second timing signal ϕ2 rises, the sense amplifier 16 is inactivated, and the pair of bit lines are set at the short voltage Vpr (<Vii). The first timing signal ϕ1 falls, the overdrive circuit 13 is activated, and the external supply voltage Vdd is supplied to the internal power line L1.

When a command for read/write operation or a command for precharge operation is provided to the SDRAM in the active pause (active mode), the third timing signal ϕ3 rises and the first voltage-drop regulator 11 is activated immediately. Consequently, the internal supply voltage is provided from the first and second voltage-drop regulators 11, 12 to the internal power line L1, thus permitting the read/write operation or precharge operation to be carried out without any trouble.

The internal supply voltage generating circuit 10 according to the first embodiment has the following advantages:

(1) In the active pause, the current consumed in the internal supply voltage generating circuit 10 includes only the current consumed by the second voltage-drop regulator 12. That is, in the active pose of the active mode, substantially the same current as the current in the stand-by mode or the power-down mode is consumed in the internal supply voltage generating circuit 10. In the active pause period, therefore, the power consumption of the internal supply voltage generating circuit 10 is decreased.

(2) When a command for canceling the active pause in the active pause period is provided to the SDRAM, the first voltage-drop regulator 11 is activated, so that the driving power necessary for read, write, or precharge operations can be provided to the sense amplifier 16.

(3) When the SDRAM shifts from the stand-by mode or the power-down mode to the active mode, the external supply voltage is provided from the overdrive circuit 13 to the sense amplifier system internal circuit 15 in accordance with the overdrive sense method. Consequently, the sense amplifier 16 rises in a short time. Then, when the voltages on the paired bit lines become substantially equal to the internal supply voltage, that is, when the operation of the sense amplifier 16 becomes stable, the overdrive circuit 13 is inactivated. Thus, the large current consumption at the beginning of the active mode is not continued, so that an increase of power consumption is prevented.

(4) Even if the overdrive circuit 13 is activated in the stand-by mode or the power-down mode, the sense amplifier system internal circuit 15 is inactivated, and therefore no current flows in the sense amplifier 16 through the overdrive circuit 13. It follows that no wasteful current is generated in the stand-by mode or the power-down mode.

(5) The internal supply voltage generating circuit 10 includes the first and second voltage-drop regulators 11, 12 and the overdrive circuit 13, and the overdrive circuit 13 includes one PMOS transistor Q18. Therefore, it is possible to reduce the power consumption while preventing an increase of the circuit area.

The first embodiment may be modified as follows.

The present invention may be applied to an internal supply voltage generating circuit for a sense amplifier power supply of a non-overdrive sense type. More specifically, in the stand-by mode, the internal supply voltage is provided from the second voltage-drop regulator 12 to the internal power line L1, and in the active mode the first voltage-drop regulator 11 is activated. Further, in the active pause, the first voltage-drop regulator 11 is inactivated.

The internal supply voltage generating circuit 10 may be used for not only for the sense amplifier, but also, for example, a step-up voltage detecting circuit or a substrate voltage detecting circuit, neither of which consume current in the active pause. The internal supply voltage generating circuit 10 may also be used for a bit line precharge voltage generating circuit, a substrate voltage generating circuit, or a reference voltage generating circuit. The internal supply voltage generating circuit for the step-up voltage detecting circuit or the substrate voltage detecting circuit is provided with a first detector circuit portion whose voltage detecting speed is relatively high in the active mode and a second detector circuit portion whose voltage detecting speed is relatively low in the stand-by or power-down mode. In the active pause, the first detector circuit portion is inactivated and the second detector circuit portion is activated.

In the active mode, the first voltage-drop regulator 11 may be activated and the second voltage-drop regulator 12 may be inactivated.

The first and second voltage-drop regulators 11, 12 are embodied in feedback type voltage-drop regulators. Instead, source floor type voltage-drop regulators may be used. In other words, the first and second voltage-drop regulators are not limited to particular circuit components, insofar as the regulators used can generate the internal supply voltage (reference voltage Vii) from the external supply voltage Vdd.

In addition to an SDRAM, the first embodiment may be applied to any other semiconductor memory device.

Figure 9:
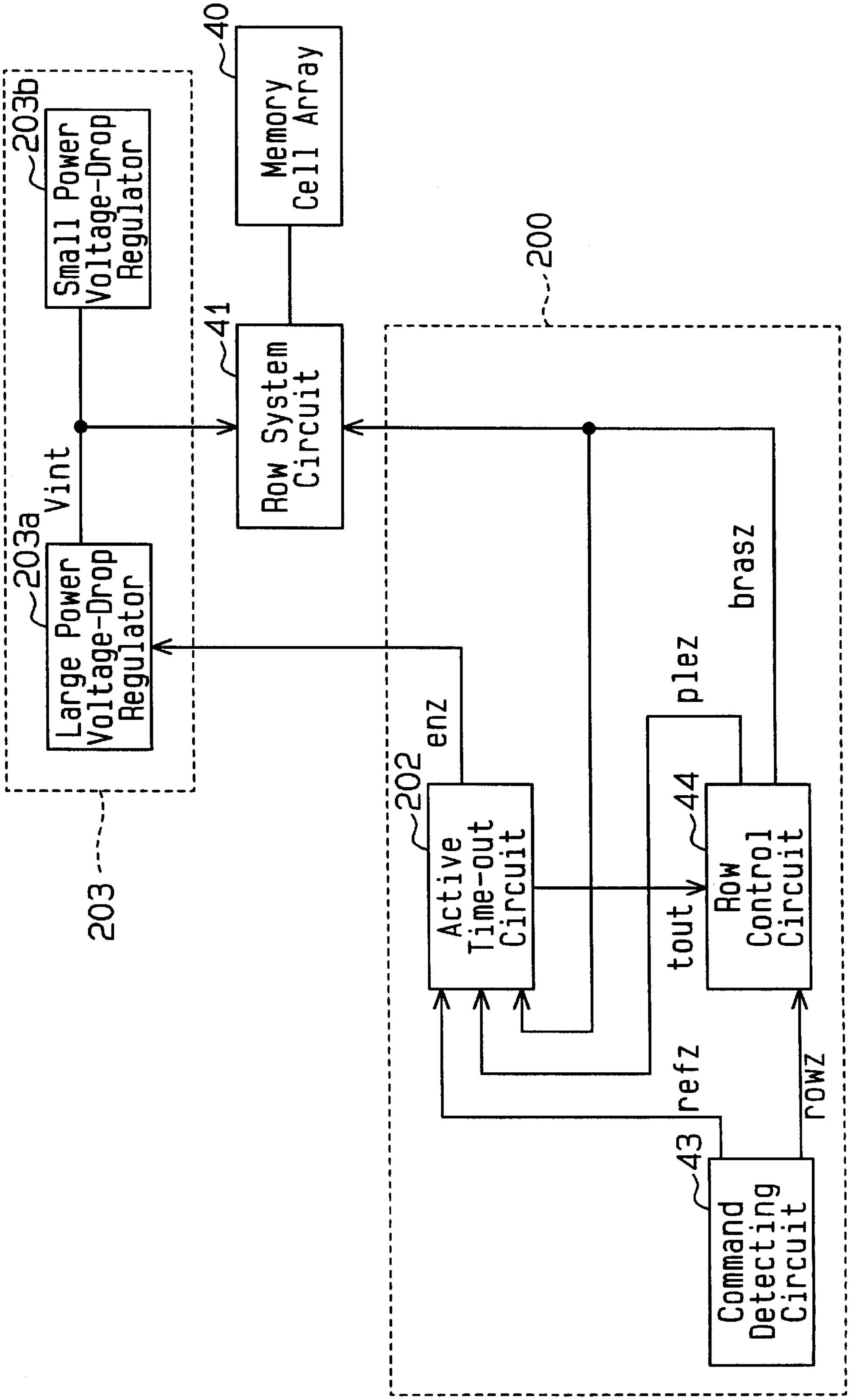
FIG. 9 is a schematic block diagram of a control circuit for an internal supply voltage generating circuit and a row system circuit according to a second embodiment of the present invention.

A description will now be given of an SDRAM according to a second embodiment of the present invention. As shown in FIG. 9, the SDRAM according to this embodiment includes a memory cell array 40, an internal supply voltage generating circuit 203, a row system circuit 41, which controls the memory cell array 40, and a control circuit 200 for the internal supply voltage generating circuit 203 and the row system circuit 41. The control circuit 200 includes a command detecting circuit 43, a row control circuit 44, and an active time-out circuit 202.

The command detecting circuit 43 receives an external command, such as a chip select signal, row address strobe signal, column address strobe signal, or write enable signal, from external devices (not shown) and detects various commands in accordance with combinations of the signals. Upon detecting a refresh command, the command detecting circuit 43 provides a row command signal rowz at high level to the row control circuit 44 and provides a refresh command signal refz at high level to the active time-out circuit 202.

In response to the row command signal rowz at high level, the row control circuit 44 generates a row control signal brasz at high level and a word line activating signal (a memory area activating signal) plez at high level slightly after the row control signal brasz. The row control signal brasz at high level is provided to the row system circuit 41, which is activated in response to the row control signal brasz at high level.

The active time-out circuit 202 receives the row control signal brasz at high level and the word line activating signal plez at high level from the row control circuit 44 and produces an activating signal enz and an active time-out signal tout in accordance with the refresh command signal refz, the row control signal brasz, and the word line activating signal plez. The activating signal enz is provided to a large power voltage-drop regulator 203*a* of the internal supply voltage generating circuit 203. To terminate the refresh operation, the active time-out circuit 202 provides the active time-out signal tout at low level to the row control circuit 44. In response to the active time-out signal tout at low level, the row control circuit 44 causes the row control signal brasz to fall, whereby the row system circuit 41 is inactivated.

The internal supply voltage generating circuit 203 includes the large power voltage-drop regulator 203*a* and a small power voltage-drop regulator 203*b*. The large power voltage-drop regulator 203*a* consumes a relatively large current and provides a relatively large driving power to the row system circuit 41. The small power voltage-drop regulator 203*b* consumes a relatively small current and provides a relatively small driving power to the row system circuit 41. The voltage-drop regulators 203*a*, 203*b* each drops an external supply voltage and generates an internal supply voltage Vint to be provided to the row system circuit 41.

The large power voltage-drop regulator 203*a* is selectively activated with the activating signal enz provided from the active time-out circuit 202. More specifically, the large power voltage-drop regulator 203*a* is activated when the activating signal enz is at high level and is inactivated when the activating signal enz is at low level. When the large power voltage-drop regulator 203*a* is in an activated state, the internal supply voltage Vint is provided from the regulator 203*a* to the row system circuit 41.

The small power voltage-drop regulator 203*b* is activated constantly and provides the internal supply voltage Vint to the row system circuit 41.

The row system circuit 41 has a plurality of circuits, including a row decoder for activating a word line. The row system circuit 41 receives the internal supply voltage Vint from the internal supply voltage generating circuit 203. When the row control signal brasz provided from the row control circuit 44 rises to high level, the row system circuit 41 is activated and performs a precharge operation for activating a word line. When the row control circuit 44 causes the row control signal, brasz, to fall in response to the active time-out signal, tout, at low level provided from the active time-out circuit 202, the row system circuit 41 is inactivated.

Figure 10:
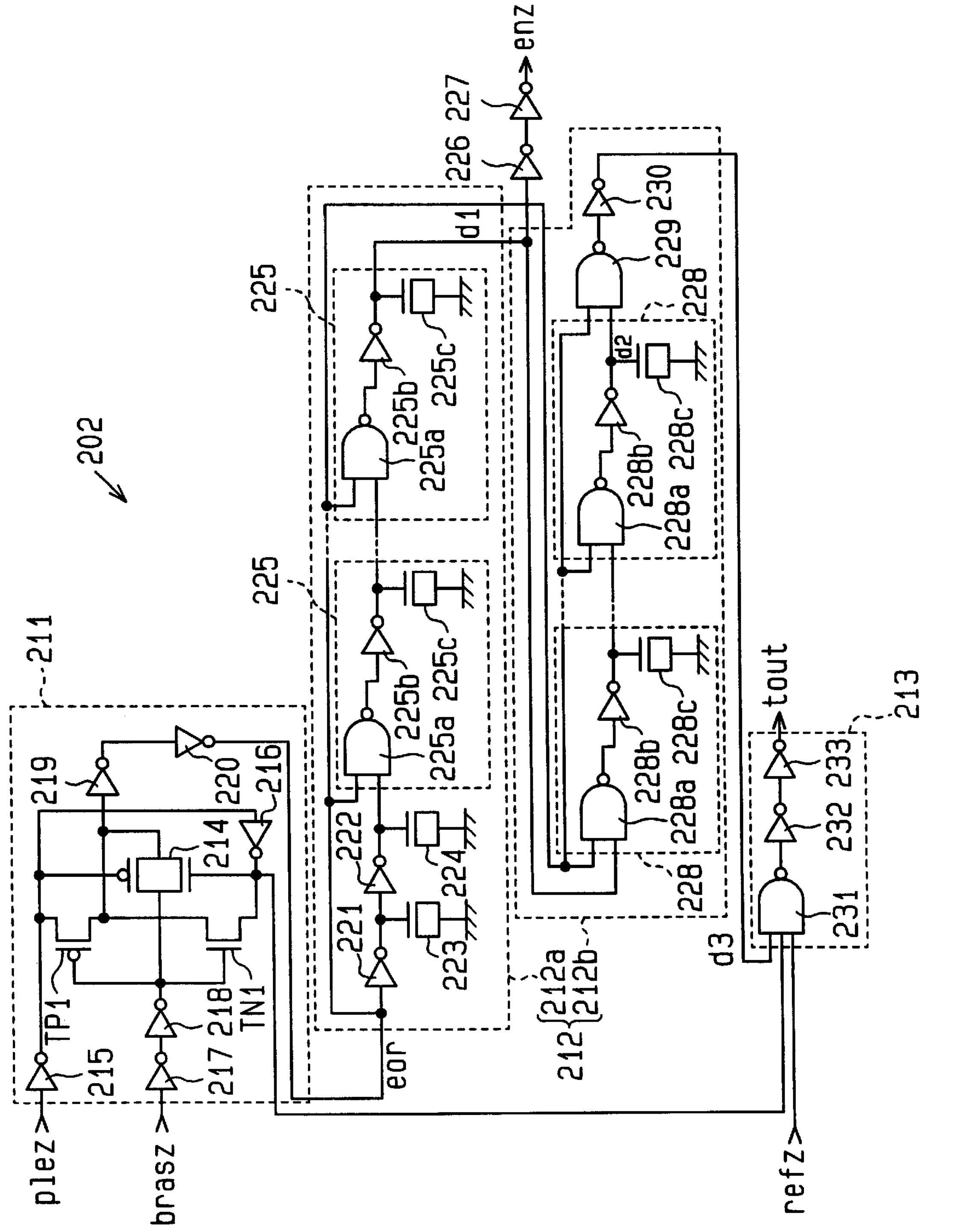
FIG. 10 is a schematic circuit diagram of an active time-out circuit of the control circuit of FIG. 9.

As shown in FIG. 10, the active time-out circuit 202 includes a detector circuit 211, a signal generating circuit 212, and an output circuit 213. The detector circuit 211 receives the row control signal brasz and the word line activating signal plez from the row control circuit 44 and performs an exclusive OR operation. The detector circuit 211 includes a transfer gate 214, a P-channel MOS (PMOS) transistor TP1, an N-channel MOS (NMOS) transistor TN1, and six inverter circuits 215, 216, 217, 218, 219, and 220.

The word line activating signal plez is provided from the inverter circuits 215, 216 to the gate of an NMOS transistor of the transfer gate 214, while the word line activating signal plez is provided to the gate of a PMOS transistor of the transfer gate 214 via the inverter circuit 215. When the word line activating signal plez rises, the transfer gate 214 is turned on, and the row control signal brasz is output from the transfer gate 214. On the other hand, when the word line activating signal plez falls, the transfer gate 214 is turned off and the passing of the row control signal brasz is blocked.

The PMOS transistor TP1 is connected between the gate of the PMOS transistor of the transfer gate 214 and an output terminal of the transfer gate 214. The NMOS transistor TN1 is connected between the gate of the NMOS transistor of the transfer gate 214 and the output terminal of the transfer gate 214. The row control signal brasz is provided to the gates of the PMOS and NMOS transistors TP1, TN1 via the inverter circuits 217 and 218.

When the row control signal brasz is at high level and the word line activating signal plez is at low level, the transfer gate 214 provides an output signal at low level. When both the row control signal brasz and the word line activating signal plez are at high level, the transfer gate 214 provides an output signal at high level. When both the row control signal brasz and the word line activating signal plez are at low level, the transfer gate 214 provides an output signal at high level. Further, when the row control signal brasz is at low level and the word line activating signal plez is at high level, the transfer gate 214 provides an output signal at low level. The output signal of the transfer gate 214 is provided as a detection signal eor to the signal generating circuit 212 via the inverter circuits 219, 220.

Figure 11:
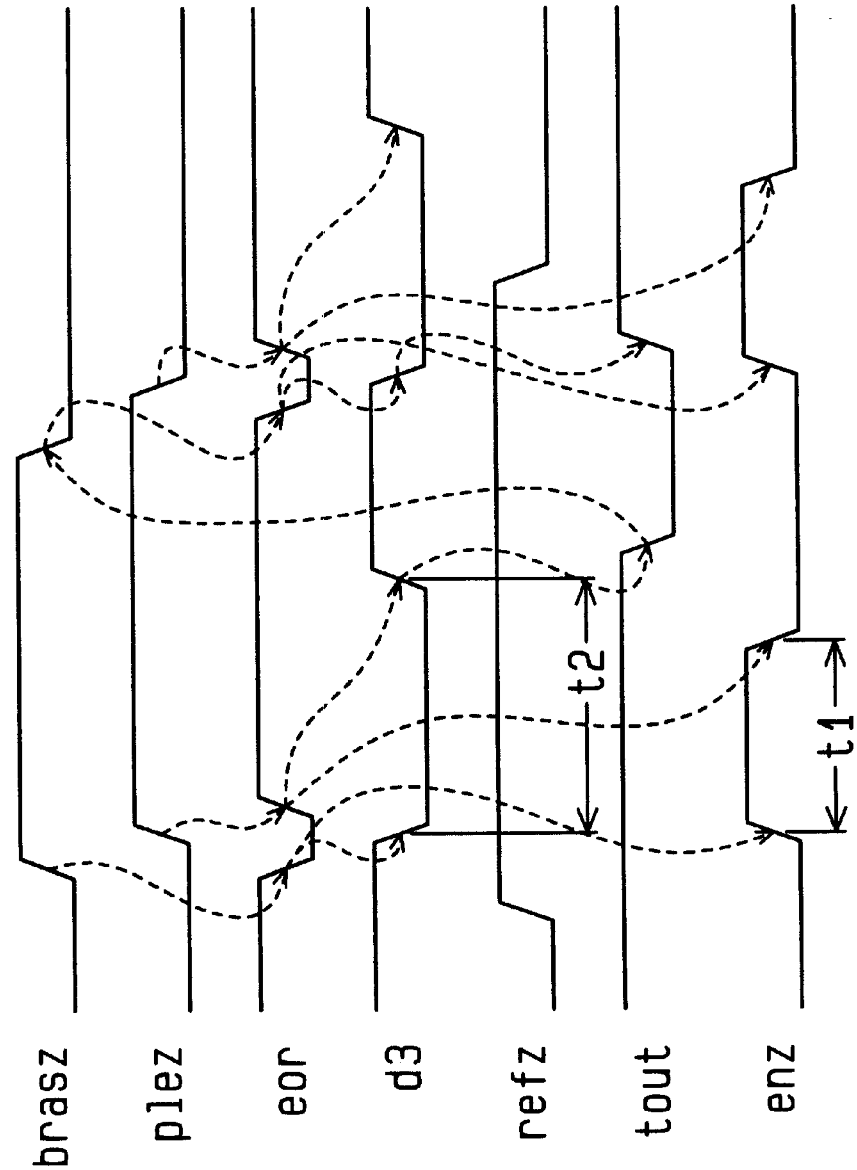
FIG. 11 is a time chart showing the operation of the active time-out circuit of FIG. 10.

As shown in FIG. 11, when the refresh command signal refz at high level and the row command signal rowz at high level are output from the command detecting circuit 43 in accordance with a refresh command, the control signal brasz rises, and then the word line activating signal plez rises slightly afterwards. During the period from the time when the row control signal brasz rises until rise of the word line activating signal plez, the detector circuit 211 outputs the detection signal eor at low level.

As shown in FIG. 10, the signal generating circuit 212 includes a first delay circuit 212*a* and a second delay circuit 212*b*. The first delay circuit 212*a* includes an input circuit which has two inverter circuits 221, 222 and two capacitors 223, 224.

The first delay circuit 212*a* also includes a plurality of series connected delay circuits 225. Each delay circuit 225 includes a NAND circuit 225*a*, an inverter circuit 225*b*, and a capacitor 225*c*. The first delay circuit 225 is connected to the input circuit.

Figure 2:
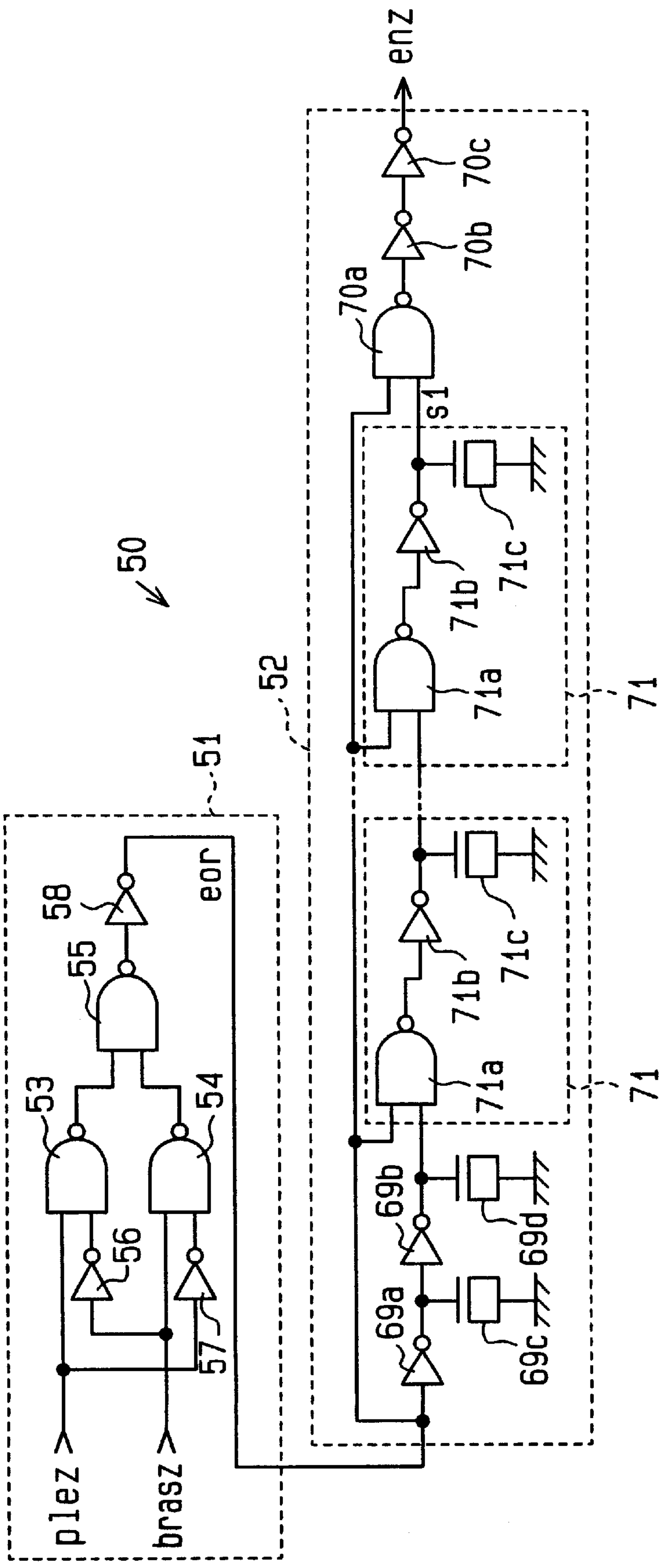
Fig.2(Prior Art)
FIG. 2 is a schematic circuit diagram of a prior art regulator control circuit of the control circuit of FIG. 1.
Figure 3:
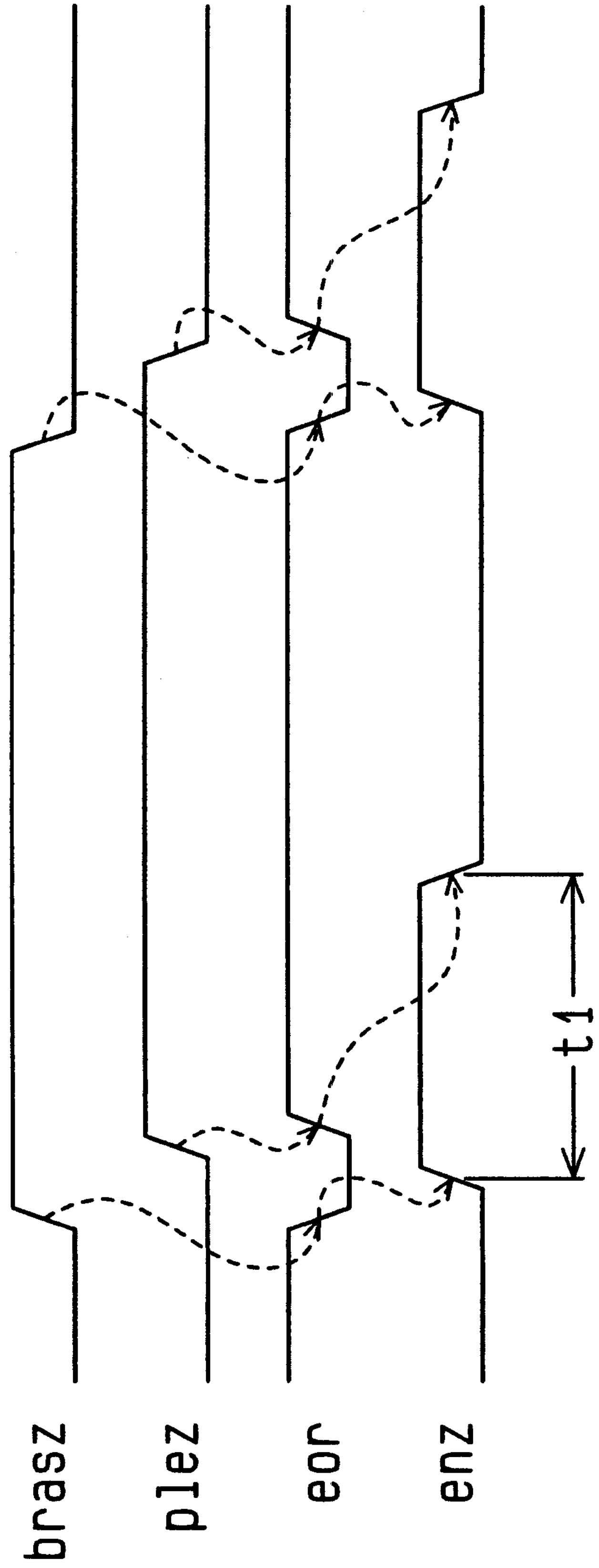
Fig.3(Prior Art)
FIG. 3 is a time chart showing the operation of the prior art regulator control circuit of FIG. 2.

The input circuit delays the detection signal eor of the detector circuit 211 by a predetermined time and provides the delayed detection signal eor to the NAND circuit 225*a* of the first delay circuit 225. The NAND circuit 225*a* of each delay circuit 225 receives the detection signal eor and a signal provided from the preceding delay circuit. Therefore, when the detection signal eor falls, an output signal d1 of the last delay circuit 225 rises, while when the detection signal eor rises, the output signal d1 of the last delay circuit 225 falls after the lapse of a predetermined time. The time after rise until fall of the output signal d1 of the last delay circuit 25 is preset to the delay time t1 of the regulator control circuit of FIG. 2. The delay time t1 can be adjusted according to the number of delay circuits 225.

The output signal d1 of the last delay circuit 225 is provided as the activation signal enz to the large power voltage-drop regulator 203*a* via inverter circuits 226, 227.

With the word line activating signal plez held at low level, as shown in FIG. 11, if the row control signal brasz rises, the detection signal eor falls. In response to the fall of the detection signal eor, the activating signal enz rises and the large power voltage-drop regulator 203*a* is activated.

Upon subsequent rise of the word line activating signal plez, the detection signal eor rises, and the activating signal enz falls upon lapse of the delay time t1 after the rise of the activating signal enz. That is, when the SDRAM enters an active pause state upon lapse of the delay time t1 after the start of an active operation, the large power voltage-drop regulator 203*a* is inactivated. Thus, like the regulator control circuit 50 of FIG. 2, the detector circuit 211 and the first delay circuit 212*a* of the active time-out circuit 202 generate the activating signal enz.

The second delay circuit 212*b* receives the output signal d1 from the first delay circuit 212*a*. The second delay circuit 212*b* includes a plurality of delay circuits 228. Each delay circuit 228 includes a NAND circuit 228*a*, an inverter circuit 228*b*, and a capacitor 228*c*. The NAND circuit 228*a* of each delay circuit 228 receives the detection signal eor and an output signal of the preceding delay circuit. The time after fall until rise of an output signal d2 of the last delay circuit 228 is determined according to the delay time t1 of the first delay circuit 212*a* and the number of delay circuits 228 of the second delay circuit 212*b*.

Figure 4:
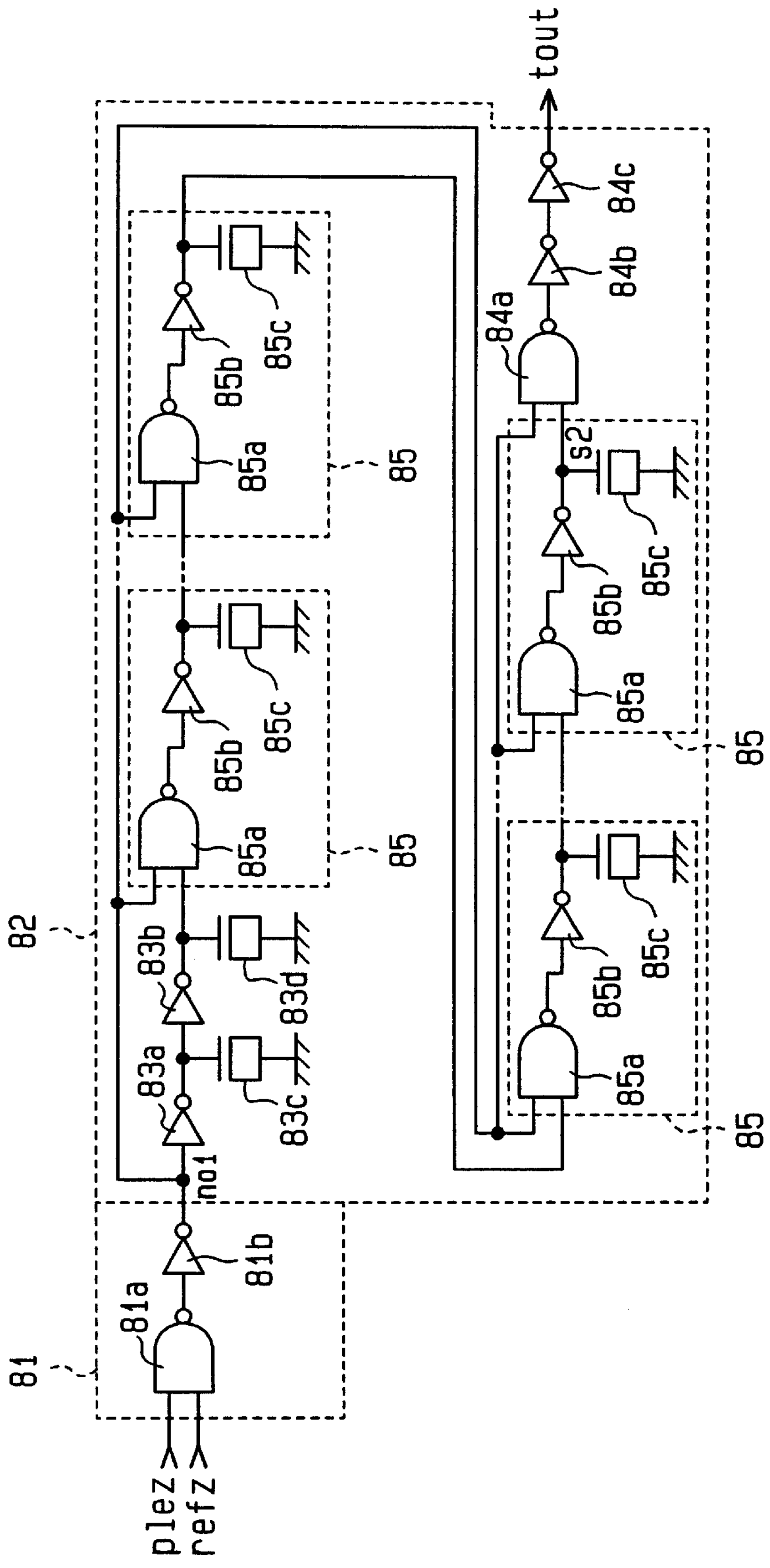
Fig.4(Prior Art)
FIG. 4 is a schematic circuit diagram of a prior art active time-out circuit of the control circuit of FIG. 1.
Figure 5:
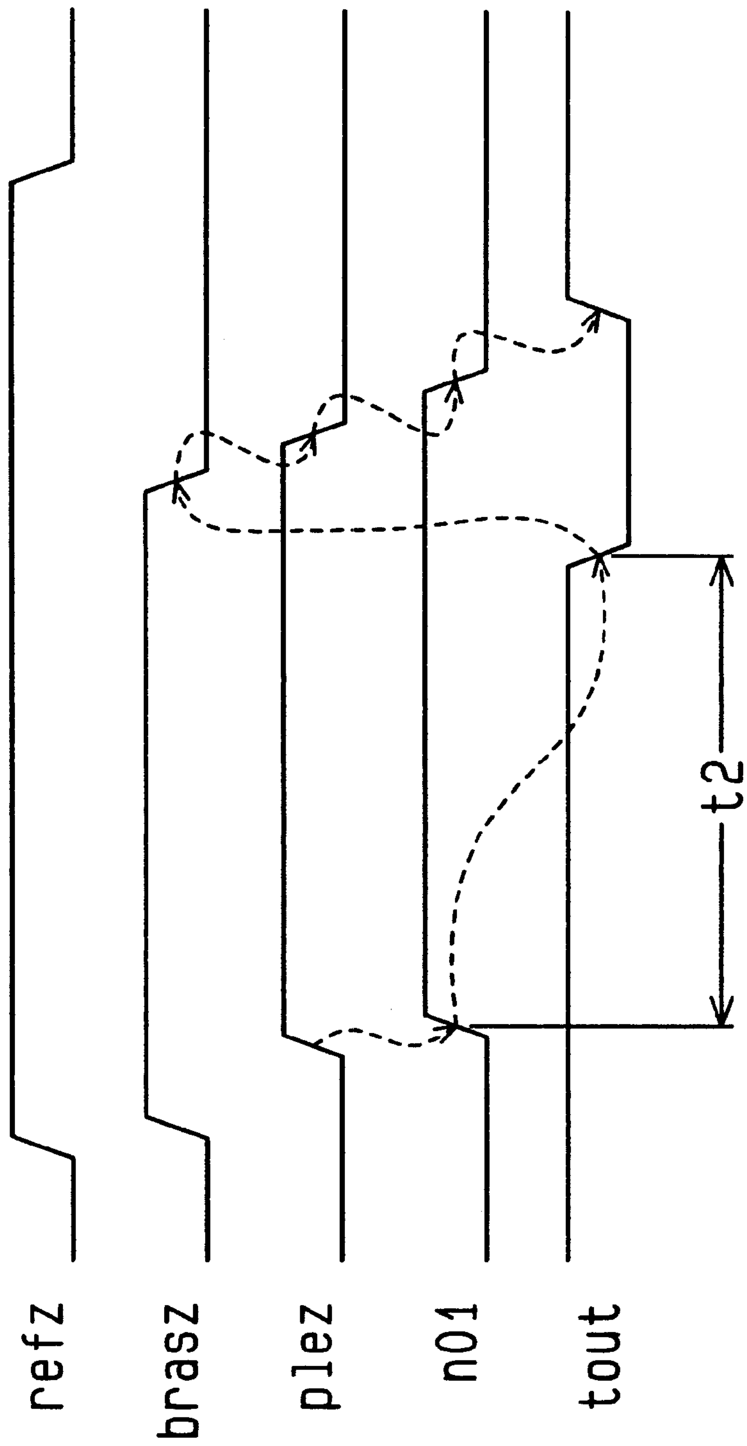
Fig.5 (Prior Art)
FIG. 5 is a time chart showing the operation of the prior art active time-out circuit of FIG. 4.

In the second embodiment, the time after fall until rise of the output signal d2 is set to the delay time t2 of the active time-out circuit 80 of FIG. 4. The delay time t2 can be adjusted according to the number of delay circuits 228.

The detection signal eor and the output signal d2 of the last delay circuit 228 are provided to a NAND circuit 229. An output signal from the NAND circuit 229 is inverted by an inverter circuit 230, and an inverted output signal d3 is provided to an output circuit 213.

The output circuit 213 includes a three-input NAND circuit 231 and two inverter circuits 232, 233. The NAND circuit 231 receives the refresh command signal refz from the command detecting circuit 43, the output signal (word line activating signal plez) from the inverter circuit 216 of the detector circuit 211, and the output signal d3 from the second delay circuit 212*b*. The NAND circuit 231 provides an output signal at low level when all of the word line activating signal plez, the output signal plez d3, and refresh command signal refz are at high level. When at least one of the signals is at low level, the NAND circuit 231 provides an output signal at high level. The output signal of the NAND circuit 231 is provided as the active time-out signal tout to the row control circuit 44 via the inverter circuits 232, 233.

When the output signal d3 rises upon lapse of the delay time t2 after rise of the word line activating signal plez with the refresh command signal refz held at high level, the active time-out signal tout falls. In response to the fall of the active time-out signal tout, the row control signal brasz falls. Then, in response to the fall of the row control signal brasz, the row system circuit 41 is inactivated. Further, the detection signal eor falls in response to the fall of the row control signal brasz.

In response to the fall of the detection signal eor, the output signal d3 of the second delay circuit 212*b* falls immediately, and the active time-out signal tout rises. Further, the word line activating signal plez falls in response to the fall of the row control signal brasz.

To be more specific, as shown in FIG. 11, if the word line activating signal plez rises in accordance with a refresh command, with the refresh command signal refz and the row control signal brasz held at high level, the detection signal eor rises. In response to the rise of the detection signal eor, the active time-out signal tout falls upon lapse of the delay time t2 after the fall of the output signal d3.

Thereafter, when the row control signal brasz falls in response to the fall of the active time-out signal tout, the detection signal eor falls, whereupon the active time-out signal tout rises, waiting for the next refreshing operation. Thus, as is the case with the active time-out circuit 80 of FIG. 4, the active time-out signal tout is produced by the detector circuit 211 and the first and second delay circuits 212*a*, 212*b*.

The SDRAM according to the second embodiment has the following advantages:

(1) The active time-out circuit 202 produces both activating signal enz and active time-out signal tout. That is, the activating signal enz is produced using the detector circuit 211 of the active time-out circuit 202 and the first delay circuit 212*a* of the signal generating circuit 212. Therefore, by using the detector circuit 211 and the first delay circuit 212*a* together, the circuit area is reduced and the power consumption decreased.

(2) Since the activating signal enz and the active time-out signal tout are both produced using detector circuit 211 and first delay circuit 212*a*, a relative relation between the delay time t1 of the activating signal enz and the delay time t2 of the active time-out signal tout becomes stable.

The second embodiment may be modified as follows.

Instead of using the active time-out circuit 202 for generating the activating signal enz, a delay circuit of a precharge time-out circuit may be used. For example, the precharge time-out circuit is configured so that a time-out condition is established when the semiconductor memory device starts an inactivating operation and internal nodes of all the circuits are initialized.

The second embodiment may be applied to the internal supply voltage generating circuit of an overdrive sense type of the first embodiment. In other words, the activating signal enz may be used as the activating signal φ1 for activating the overdrive circuit 13 selectively. When the sense amplifier of the row system internal circuit is inactivated, the overdrive circuit 13 provides the external supply voltage as the sense amplifier supply voltage to the sense amplifier. When the sense amplifier is activated and the bit line voltage reaches a predetermined voltage, the overdrive circuit 13 is inactivated by the activating signal enz.

The second embodiment may be applied not only to an SDRAM, but also to any other semiconductor memory device.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for controlling an internal supply voltage generating circuit that supplies power to an internal circuit of a semiconductor device, the internal supply voltage generating circuit including a first voltage-drop regulator, which supplies a relatively large driving power to the internal circuit, and a second voltage-drop regulator, which supplies a relatively small driving power to the internal circuit, the method comprising:

- activating the second voltage-drop regulator and inactivating the first voltage-drop regulator in one of a stand-by mode and a power-down mode;
- activating at least the first voltage-drop regulator in an active mode;
- inactivating the first voltage-drop regulator in an active pause of the active mode; and
- activating the first voltage-drop regulator when the active pause is cancelled.

2. A method for controlling an internal supply voltage generating circuit that supplies power to a sense amplifier system internal circuit including a sense amplifier in a semiconductor memory device, the internal supply voltage generating circuit including a first voltage-drop regulator, which supplies a relatively large driving power to the sense amplifier system internal circuit, and a second voltage-drop regulator, which supplies a relatively small driving power to the sense amplifier system internal circuit, the method comprising:

- activating the second voltage-drop regulator and inactivating the first voltage-drop regulator in one of a stand-by mode and a power-down mode;
- activating at least the first voltage-drop regulator in an active mode;
- inactivating the first voltage-drop regulator in an active pause of the active mode; and
- activating the first voltage-drop regulator when the active pause is cancelled.

3. The method according to claim 2, wherein the second voltage-drop regulator supplies a minimum required driving power to the sense amplifier system internal circuit in one of the stand-by mode and the power-down mode.

4. The method according to claim 2, wherein the internal supply voltage generating circuit includes an overdrive circuit, which supplies an external supply voltage as a sense amplifier supply voltage to the sense amplifier when the sense amplifier is inactivated, the method further comprising activating the overdrive circuit until the sense amplifier supply voltage, in the active mode, changes from the external supply voltage to an internal supply voltage that is generated by at least one of the first and second voltage-drop regulators.

5. The method according to claim 4, wherein the second voltage-drop regulator supplies a minimum required driving power to the sense amplifier in one of the stand-by mode and the power-down mode.

6. The method according to claim 2, wherein the internal supply voltage generating circuit is a circuit selected from the group consisting of a step-up voltage detecting circuit, a substrate voltage detecting circuit, a bit line precharge voltage generating circuit, and a substrate voltage generating circuit.

7. An internal supply voltage generating circuit of a semiconductor memory device, for supplying a driving power to a sense amplifier system internal circuit including a sense amplifier, comprising:

- a first voltage-drop regulator connected to the sense amplifier system internal circuit, wherein the first voltage-drop regulator is selectively activated in accordance with a first timing signal and supplies a relatively large driving power to the sense amplifier system internal circuit, and wherein the first voltage-drop regulator is activated when the semiconductor memory device shifts from one of a stand-by mode and a power-down mode to an active mode, is inactivated when the semiconductor memory device enters a state of an active pause in the active mode, and is activated when the active pause is cancelled; and a second voltage-drop regulator connected to the sense amplifier system internal circuit, wherein the second voltage-drop regulator is constantly activated and supplies a relatively small driving power to the sense amplifier system internal circuit.

8. The internal supply voltage generating circuit according to claim 7, wherein the second voltage-drop regulator supplies a minimum required driving power to the sense amplifier system internal circuit in one of the standby mode and the power-down mode.

9. The internal supply voltage generating circuit according to claim 7, further including:

an overdrive circuit connected to the sense amplifier system internal circuit, for supplying an external supply voltage as a sense amplifier supply voltage to the sense amplifier when the sense amplifier is inactivated, wherein the overdrive circuit is activated in accordance with a second timing signal until the sense amplifier supply voltage changes from the external supply voltage to an internal supply voltage, which is generated by at least one of the first and second voltage-drop regulators, when the semiconductor memory device is in the active mode.

10. The internal supply voltage generating circuit according to claim 9, wherein the second voltage-drop regulator supplies a minimum required driving power to the sense amplifier system internal circuit in one of the standby mode and the power-down mode.

11. The internal supply voltage generating circuit according to claim 7, wherein the internal supply voltage generating circuit is a circuit selected from the group consisting of a step-up voltage detecting circuit, a substrate voltage detecting circuit, a bit line precharge voltage generating circuit, and a substrate voltage generating circuit.

12. A control circuit for a supply voltage generating circuit that supplies an internal supply voltage to an internal circuit, the internal circuit being selectively activated for a predetermined period in accordance with an activation control signal, the control circuit comprising:

a signal generating circuit that generates a control signal for controlling the activation control signal; and an activating signal generating circuit that generates an activation signal for selectively activating the supply voltage generating circuit, wherein the signal generating circuit and the activating signal generating circuit includes at least one shared delay circuit that is used to generate the control signal and the activating signal.

13. A semiconductor memory device comprising:

a memory cell array;

a row system circuit that controls the memory cell array, wherein the row system circuit is selectively activated for a predetermined period of time in accordance with a first control signal;

a supply voltage generating circuit that supplies an internal supply voltage to the row system circuit in response to an activating signal;

a signal generating circuit that generates a second control signal for controlling the first control signal; and an activating signal generating circuit that generates the activating signal for selectively activating the supply voltage generating circuit, wherein the signal generating circuit and the activating signal generating circuit includes at least one shared delay circuit that is used to generate the second control signal and the activating signal.

14. The semiconductor memory device according to claim 13, wherein the signal generating circuit is a precharge time-out circuit that generates a precharge time-out signal as the second control signal.

15. The semiconductor memory device according to claim 13, wherein the signal generating circuit is an active time-out circuit that generates an active time-out signal as the second control signal.

16. The semiconductor memory device according to claim 15, wherein in accordance with a refresh command signal based on a refresh command, a memory cell activating signal for activating a memory cell, and a row control signal as the first control signal, the active time-out circuit generates the activating signal and the active time-out signal.

17. The semiconductor memory device according to claim 16, wherein the activating signal generating circuit includes:

a detector circuit that detects an activated state of the row system circuit and the memory cell in accordance with the memory cell activating signal and the row control signal to generate a detection signal; and a first delay circuit that generates the activating signal for a first predetermined period of time after an activated state of the row system circuit has been detected in accordance with the detection signal, and wherein the active time-out circuit includes:

a second delay circuit, connected to the first delay circuit, for generating the active time-out signal using the activating signal in accordance with the detection signal for a second predetermined period of time after the row system circuit has been activated; and an output circuit, connected to the second delay circuit, for outputting the active time-out signal in accordance with the refresh command signal and the memory cell activating signal.

18. The semiconductor memory device according to claim 13, wherein the supply voltage generating circuit includes a large power voltage-drop regulator that is selectively activated in accordance with the activating signal and supplies a relatively large driving power, and a small power voltage-drop regulator that is constantly activated and supplies a relatively small driving power.

19. The semiconductor memory device according to claim 13, further comprising an overdrive circuit connected to the row system circuit, for supplying an external supply voltage to the row system circuit.

20. The semiconductor memory device according to claim 19, wherein the overdrive circuit is selectively activated in accordance with the activating signal.

21. A semiconductor memory device having an active mode and an active pause mode, comprising:

sense amplifiers;

a first internal power supply voltage generating circuit coupled to the sense amplifiers for supplying a first internal power supply voltage to the sense amplifiers; and a second internal power supply voltage generating circuit coupled to the sense amplifiers for supplying a second internal power supply voltage to the sense amplifiers, wherein the first internal power supply voltage generating circuit has a relatively large drivability and is activated in accordance with an active command to enter the active mode when the sense amplifiers are activated, and the first internal power supply voltage generating circuit is inactivated upon entering the active pause mode and is activated again in response to an operation command in the active pause mode, and wherein the second internal power supply voltage generating circuit has a relatively small drivability and is constantly activated.

22. The semiconductor memory device according to claim 21, wherein the semiconductor memory device has a stand-by mode and a power-down mode, and the second internal power supply voltage generating circuit supplies a minimum required second internal power supply voltage to the sense amplifiers in one of the stand-by mode and the power-down mode.

23. The semiconductor memory device according to claim 21, further comprising:

an overdrive circuit connected to the sense amplifiers, for supplying an external supply voltage as a sense amplifier supply voltage to the sense amplifiers when the sense amplifiers are inactivated, wherein the overdrive circuit is activated in accordance with a timing signal until the sense amplifier supply voltage changes from the external supply voltage to at least one of the first and second internal supply voltages in the active mode.

24. The semiconductor memory device according to claim 23, wherein the semiconductor memory device has a stand-by mode and a power-down mode, and the second internal power supply voltage generating circuit supplies a minimum required second internal power supply voltage to the sense amplifiers in one of the stand-by mode and the power-down mode.

25. The semiconductor memory device according to claim 21, wherein the first and second internal supply voltage generating circuits are included in a circuit selected from the group consisting of a step-up voltage detecting circuit, a substrate voltage detecting circuit, a bit line precharge voltage generating circuit, and a substrate voltage generating circuit.

26. In a semiconductor memory device, a method for controlling an internal supply voltage generating circuit including a first internal power supply voltage generating circuit, which has a relatively large drivability, and a second internal power supply voltage generating circuit, which has a relatively small drivability, the first and second internal power supply voltage generating circuits supplying first and second internal power supply voltages to sense amplifiers, the method comprising:

constantly activating the second internal power supply voltage generating circuit;

activating the first internal power supply voltage generating circuit in response to an active command in an active mode;

inactivating the first internal power supply voltage generating circuit in an active pause mode; and activating the first internal power supply voltage generating circuit in response to an operation command in the active pause mode.

27. The method according to claim 26, wherein the second internal power supply voltage generating circuit supplies a minimum required second internal power supply voltage to the sense amplifiers in one of a stand-by mode and a power-down mode.

28. The method according to claim 26, wherein the internal supply voltage generating circuit includes an overdrive circuit, which supplies an external supply voltage as a sense amplifier supply voltage to the sense amplifiers when the sense amplifiers are inactivated, the method further comprising activating the overdrive circuit until the sense amplifier supply voltage, in the active mode, changes from the external supply voltage to at least one of the first and second internal power supply voltages.

29. The method according to claim 28, wherein the second internal power supply voltage generating circuit supplies a minimum required second internal power supply voltage to the sense amplifiers in one of a stand-by mode and a power-down mode.

30. The method according to claim 26, wherein the internal supply voltage generating circuit is a circuit selected from the group consisting of a step-up voltage detecting circuit, a substrate voltage detecting circuit, a bit line precharge voltage generating circuit, and a substrate voltage generating circuit.

* * * * *

UNITED STATES PATENT AND TRADEMARK OFFICE
CERTIFICATE OF CORRECTION

PATENT NO. : 6,385,119 B2

DATED : May 7, 2002

INVENTOR(S) : Isamu Kobayashi et al.

It is certified that error appears in the above-identified patent and that said Letters Patent is hereby corrected as shown below:

Title page, Item [54] and Column 1, line 2,
Please change the word "CICUIT" to -- CIRCUIT --.

Signed and Sealed this

Twenty-first Day of January, 2003

JAMES E. ROGAN
*Director of the United States Patent and Trademark Office*